United States Patent [19]
Fujioka et al.

[11] Patent Number: 4,757,248
[45] Date of Patent: Jul. 12, 1988

[54] INDUCTION MOTOR TORQUE CONTROL SYSTEM

[75] Inventors: Yoshiki Fujioka, Higashiyamato; Shinichi Kouno, Hino, both of Japan

[73] Assignee: Fanuc Ltd, Minamitsuru, Japan

[21] Appl. No.: 933,746

[22] PCT Filed: Feb. 20, 1986

[86] PCT No.: PCT/JP86/00079
§ 371 Date: Oct. 21, 1986
§ 102(e) Date: Oct. 21, 1986

[87] PCT Pub. No.: WO86/05043
PCT Pub. Date: Aug. 28, 1986

[30] Foreign Application Priority Data
Feb. 25, 1985 [JP] Japan .................... 60-36051

[51] Int. Cl.$^4$ .............................. H02P 5/28
[52] U.S. Cl. .................... 318/807; 318/800; 318/803; 318/806
[58] Field of Search ........... 318/432, 433, 798, 799, 318/800, 801, 802, 806, 807, 803, 811

[56] References Cited

U.S. PATENT DOCUMENTS

| | | | |
|---|---|---|---|
| 4,456,868 | 6/1984 | Yamamura et al. | 318/800 |
| 4,499,414 | 2/1985 | Fujioka et al. | 318/803 |
| 4,503,376 | 3/1985 | Okuyama | 318/802 |
| 4,558,269 | 12/1985 | Ishida et al. | 318/806 |
| 4,672,287 | 6/1987 | Fujioka et al. | 318/806 |
| 4,672,288 | 6/1987 | Abbondanti | 318/806 |

*Primary Examiner*—William M. Shoop, Jr.
*Assistant Examiner*—Brian Young
*Attorney, Agent, or Firm*—Staas & Halsey

[57] ABSTRACT

An induction motor torque control system is provided for resolving an excitation current command and a secondary current command into an excitation flux vector component and electromotive force-direction (torque direction) vector component, respectively, based on a torque command for the motor and an excitation flux command, decided for the motor, in such a manner that a linear output torque is obtained in response to these commands. A primary current command for the motor is obtained by combining these vector values.

2 Claims, 3 Drawing Sheets

V   : TERMINAL VOLTAGE
$E_1$ : INDUCED ELECTROMOTIVE FORCE
$R_1$ : WINDING RESISTANCE
$X_1$ : PRIMARY LEAKAGE REACTANCE
$R_2$ : SECONDARY RESISTANCE
$X_2$ : SECONDARY LEAKAGE REACTANCE
S   : SLIP
$I_1$ : PRIMARY CURRENT
$I_0$ : EXCITATION CURRENT
$I_2$ : SECONDARY CURRENT

INDUCTION MOTOR TORQUE CONTROL SYSTEM

BACKGROUND OF THE INVENTION

This invention relates to a system for controlling the torque of an induction motor.

Recently, vector control generally has been employed for controlling the velocity of induction motors. When controlling the velocity of an induction motor in accordance with such vector control, a torque command, excitation current, secondary current and slip frequency become non-linear due to such effects as the secondary leakage impedance and core loss of the motor in cases where velocity control is performed up to a region of high rotational velocity, as in the spindle motor of a machine tool, or the like, or in cases where control is performed to weaken excitation in accordance with the torque command at a constant rpm. As a result, the output torque also becomes non-linear with respect to the torque command and an accurate torque command cannot be produced.

A conventional approach for dealing with this is to use external equipment such as a torque sensor to measure motor torque as a means for accurately ascertaining the output torque of the motor. A problem that results is the high cost of equipment.

SUMMARY OF THE INVENTION

The present invention solves the aforementioned problem of the prior art, and an object thereof is to provide an induction motor torque control system in which output torque is linearly controlled in response to a torque command without requiring special torque measurement equipment.

A system for controlling the torque of an induction motor according to the present invention includes: means for deciding a torque command for an induction motor and an excitation flux command from an excitation frequency; means for deciding an excitation flux component of excitation current from the excitation flux; means for deciding a component, in the direction of an electromotive force, of the excitation current from the excitation flux and excitation frequency; means for deciding a component, in the direction of the electromotive force, of a secondary current of the motor from the torque command and excitation flux command; means for deciding a slip frequency from the component, in the direction of the electromotive force, of the secondary current and the excitation flux command; means for deciding an excitation flux component of the secondary current, from the component in the direction of the electromotive force, of the secondary current and from the slip frequency; and means for obtaining an excitation flux component, and a component in the direction of the electromotive force of the primary current of the motor, a the excitation flux component and from component in the direction of the electromotive force of the excitation current and secondary current, respectively, and for limiting a primary current command for the motor upon combining these components.

Accordingly, by obtaining a slip frequency command which will cause the required load current to flow, the present invention enables the torque command itself to be substituted for the output torque in order to linearly control the motor torque, this being performed without requiring special torque measurement equipment.

DETAILED DESCRIPTION OF THE PREFERRED EMBODIMENTS

An embodiment of the present invention will now be described in detail with reference to the drawings.

Figure 3:
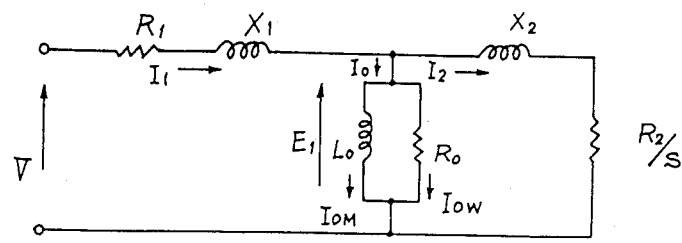
FIG. 3 is a schematic diagram illustrating an equivalent circuit of an induction motor.
Figure 4:
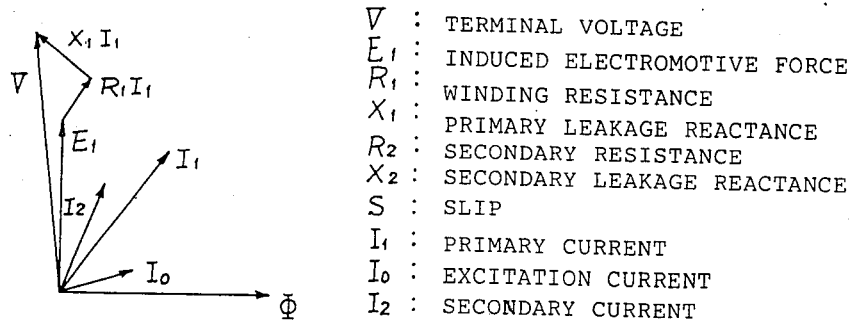
FIGS. 4 and 5 are vector diagrams showing the relationship of various characteristics of an induction motor.

First, the present invention is based on the relationship among various characteristics of an induction motor, including winding resistance $R_1$, primary leakage reactance $X_1$, excitation resistance $R_o$, terminal voltage $V$, etc., and will be described with reference to the equivalent circuit of FIG. 3 and the vector diagrams of FIGS. 4 and 5.

A secondary input P2 of an induction motor is found in accordance with $$P_2 = E_1 \times I_1 \times \cos \theta_2 \quad (1)$$

Letting $\phi$ represent excitation flux and letting $\omega_o$ denote the excitation frequency, an induced electromotive force $E_1$ is expressed by $$E_1 = d\phi/dt = \omega_o \times \phi \quad (2)$$

The secondary current is expressed by $$\begin{aligned} I_2 &= E_1/|Z_2| \\ &= E_1/\sqrt{(R_2/S)^2 + X_2^2} \end{aligned} \quad (3)$$

The power factor is obtained from $$\begin{aligned} \cos\theta &= (R_2/S)/|Z| \\ &= (R_2/S)/\sqrt{(R_2/S)^2 + X_2^2} \end{aligned} \quad (4)$$

Substituting Eqs. (2), (3), (4) into Eq. (1) gives us $$\begin{aligned} P_2 &= E_1^2(R_2/S)/[R_2/S)^2 + X_2^2] \\ &= I_2^2 (R_2/S) \end{aligned} \quad (5)$$

Secondary core loss $P_{2r}$ is obtained from $$P_2r = I_2^2 R_2 = S \times P_2 \quad (6)$$

The output $P_m$ of the motor is expressed by $$P_m = P_2 - P_2r \times (1-S)P_2 \quad (7)$$

Letting $T_m$ represent the motor torque and $\omega_m$ the rotational speed of the motor, we have $$Pm = \omega_m \times T_m \quad (8)$$

The torque $T_m$ of the motor can be written as follows using Eqs. (1), (2), (7) and (8):

$$\begin{aligned} T_m &= P_m/\omega_m \quad (9)\\ &= (1-S)\,P_2/\omega_m \\ &= (1/\omega_m) \times [1-(\omega_s/\omega_o)] \times P_2 \\ &= P_2/\omega_o \\ &= (1/\omega_o) \times E_1 \times I_2 \times \cos\theta_2 \\ &= \phi \times I_2 \times \cos\theta_2 \end{aligned}$$

Note that $\omega_s$ represents the slip frequency.

Figure 5:
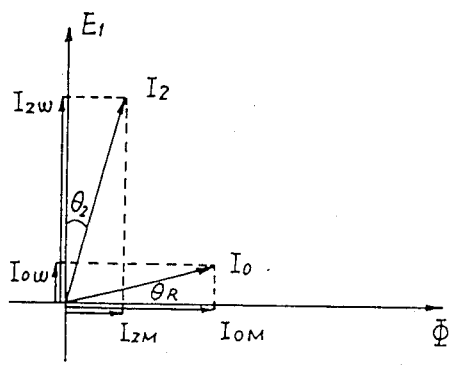

Next, as shown in FIG. 5, the $\phi$-axis component (excitation flux component) and $E_1$-axis component (component in the direction of the electromotive force) of $I_o$ and $I_2$ are obtained as $I_{oM}$, $I_o\omega$, and $I_{2M}$, $I_2\omega$, respectively, as follows: Letting $L_o$ represent the excitation impedance, we have $$\phi = L_o \times I_o$$

so that $$I_{oM} = (1/L_o) \times \phi \quad (10)$$

$I_o\omega$ is the core loss component, and we let K represent a constant of proportion. This gives us $$I_o\omega = K \times \omega_o \times \phi \quad (11)$$

as an approximation.

Further, transforming Eq. (9) gives us $$I_2\omega = I_2 \times \cos\theta_2 = T_m/\phi \quad (12)$$

The $\phi$-axis component $I_{2M}$ of the secondary current is obtained as follows:

$$\begin{aligned} I_{2M} &= I_2 \times \sin\theta_2 = I_2\omega \times \tan\theta_2 \quad (13)\\ &= I_2\omega \times [X_2/(R_2/S)] \\ &= I_2\omega \times (SX_2/R_2) \\ &= I_2\omega \times \omega_s \times (L_2/R_2) \end{aligned}$$

We obtain $I_2\omega$ from Eqs. (2), (3), (4), (12) as follows:

$$\begin{aligned} I_2\omega &= I_2 \times \cos\theta_2 \\ &= [(E_1 \times (R_2/S)]/[(R_2/S)^2 + X_2^2] \\ &= \omega_o \times \phi \times (R_2/S)/[(R_2/S)^2 + X_2^2] \\ &= [\phi \times (\omega_o \times S \times R_2)]/[R_2^2 + (SX_2)^2] \\ &= (\phi \times \omega_s \times R_2)/[R_2^2 + (\omega_s \times L_2)^2] \end{aligned}$$

where $X_2 = \omega_o \times L_2$ and $\omega_s = S \times \omega_o$

Dividing both sides by $\phi$ gives us $$I_2\omega/\phi = (\omega_s \times R_2)/[(R_2^2 + (\omega_s L_2)^2] \quad (14)$$

With the foregoing serving as a premise, we will now describe a preferred embodiment, in accordance with the invention, of obtaining the primary current and slip frequency conforming to a torque command.

In general, the maximum value of excitation flux $\phi$ is decided by using the maximum excitation current capable of flowing in the motor, or the maximum voltage capable of being impressed upon the motor. In actual control of a motor, there are cases where excitation is weakened when the load is small in order to reduce excitation noise. In the following explanation, however, it will be assumed that the flux command gives the maximum value.

When the torque command $T_m$ and excitation flux command $\phi$ are applied, $I_{oM}$ is found from Eq. (10), $I_o\omega$ from Eq. (11), and $I_2\omega$ from Eq. (12).

Next, the slip frequency $\omega_s$ is decided in accordance with Eq. (14) using $I_2\omega$ and $\phi$. However, since it is difficult to calculate $\omega_s$ by a CPU or the like in a short period of time, values of $\omega_s$ are found in advance with respect to values of $I_2\omega/\phi$, $\omega_s$ is stored in memory as a data table, and the value of $I_2\omega/\phi$ is stored in memory as a data address.

Thus, if $I_2\omega$ and $\omega_s$ are found, $I_{2M}$ can be obtained from Eq. (13).

From the foregoing, the $\phi$-axis component $I_1(\phi)$ of the primary current $I_1$ can be obtained from:

$$I_1(\phi) = I_{oM} + I_{2M} \quad (15)$$

and the $E_1$-axis component $I_1(E_1)$ of the primary current $I_1$ can be obtained from:

$$I_1(E_1) = I_o\omega + I_2\omega \quad (16)$$

The primary current thus obtained is a current command, which takes all characteristics of the induction motor into account, for obtaining a linear output torque with respect to a torque command.

Further, $I_1(\phi)$, $I_1(E_1)$ correspond to an excitation current component and load current component, respectively, in vector control of the induction motor.

The specifics of the present invention will now be described with reference to the schematic diagram of FIG. 1 and flowchart of FIG. 2.

(1) A velocity command $\omega_c$ and the induction motor rotational speed $\omega_m$, which is obtained by a tachogenerator TG coupled to the output shaft of the motor M, are applied to a comparator "a", and the torque command $T_m$ is calculated by performing the arithmetic operation $$T_m = K_1(\omega_c - \omega_m) + K_2 \int(\omega_c - \omega_m)dt$$

In vector control, a calculation method in which a calculation is performed as indicated by the above equation using a velocity deviation, the result of the calculation is regarded as a torque command and is commonly known; hence, a description of the foregoing is omitted.

Figure 1:
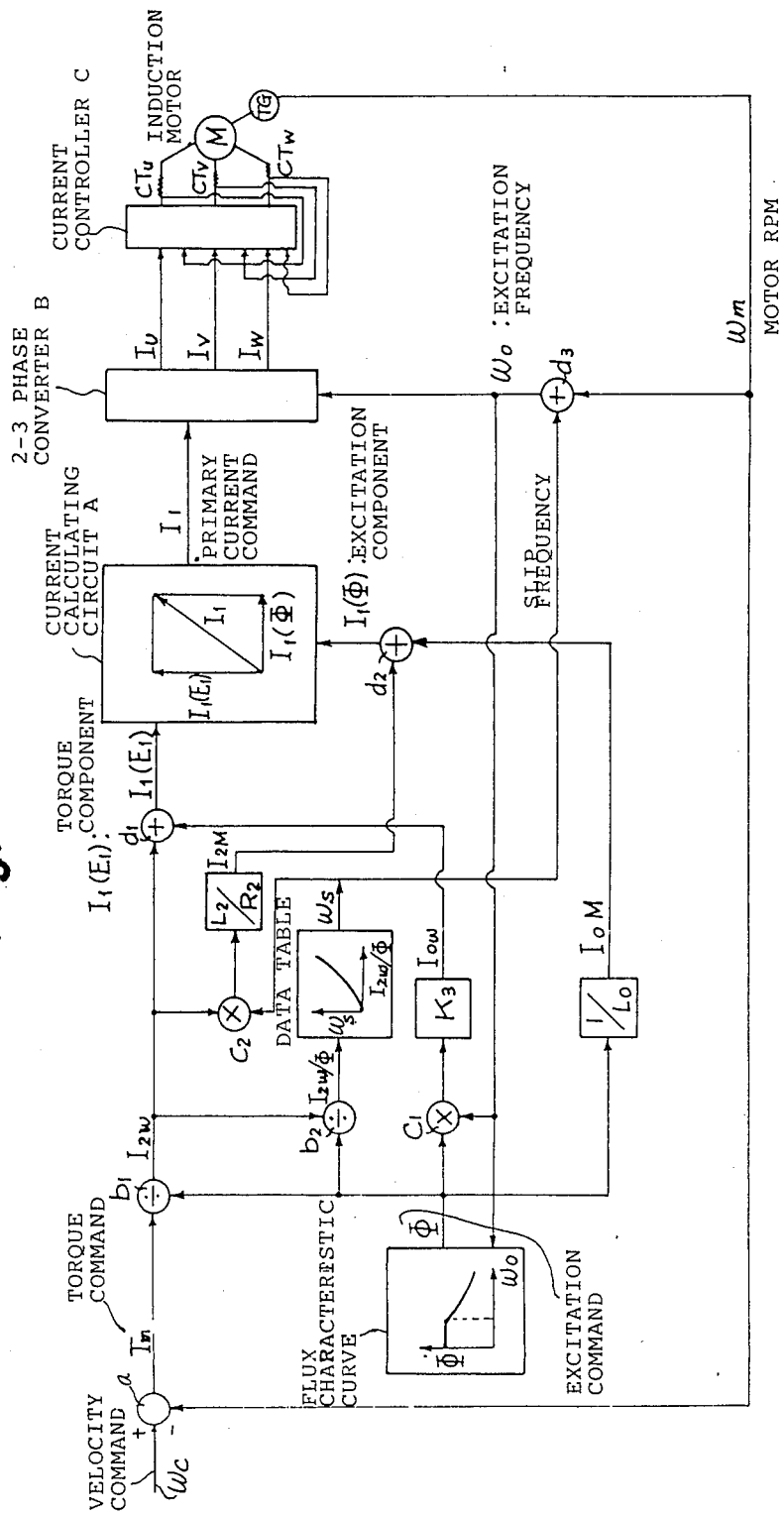
FIG. 1 is a schematic diagram illustrating the interconnection of devices in an embodiment of the present invention.
Figure 2:
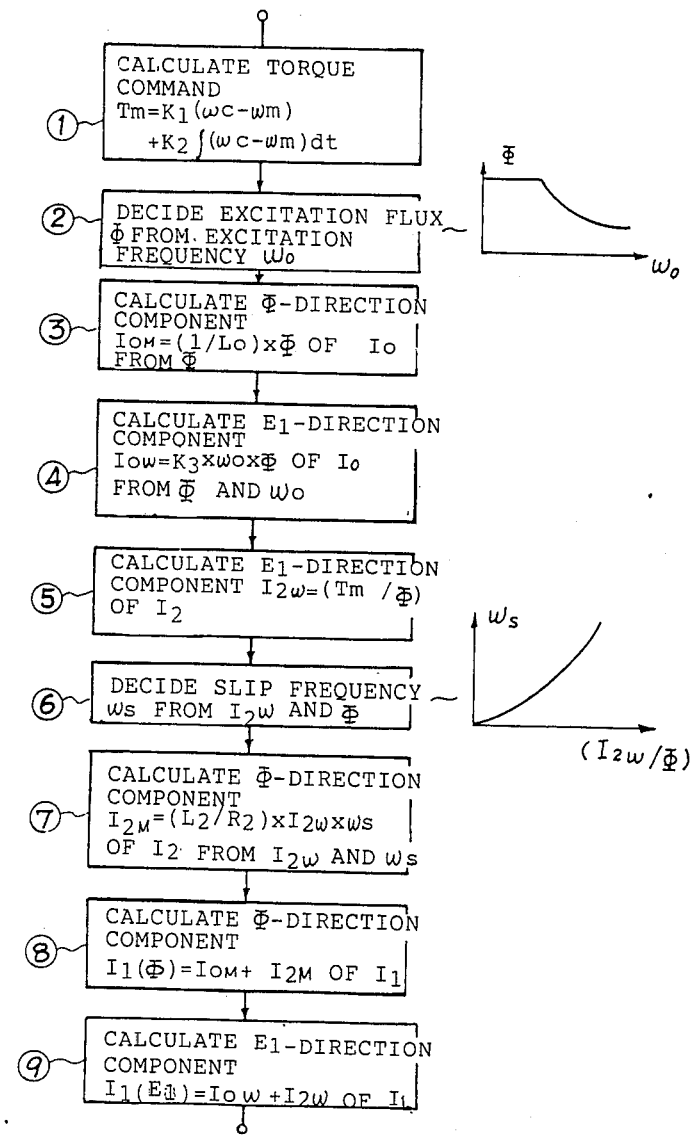
FIG. 2 is a flowchart illustrating a torque control operation of the present invention.

(2) Excitation flux $\phi$ on a flux characteristic curve, as shown in FIG. 1 is decided from the excitation frequency $\omega_o$.

(3) The $\phi$-direction component $I_{oM}$ of excitation current $I_o$ is obtained from the excitation flux $\phi$ as shown below and in FIG. 1.

$$I_{oM} = (1/L_o) \times \phi$$

This is applied to an adder $d_2$.

(4) The $E_1$-direction component of $I_o$ is obtained from $\phi$ and $\omega_o$ in the form $$I_o\omega = K_3 \times \omega_o \times \phi$$

Where $K_3$ is a constant of proportionality and $I_{OW}$ is applied to an adder $d_1$ (see FIG. 1).

(5) The $E_1$-direction component of the secondary current $I_2$ is obtained in the form $$I_2\omega = (T_m/\phi)$$

by the divider $b_1$.

(6) Using the $I_2\omega$ and excitation flux command $\phi$ that have been obtained, the divider $b_2$ divides $I_2\omega$ by $\phi$. Then, a slip frequency $\omega_s$ corresponding to the data address $I_2\omega/\phi$, which is the result of the calculation, is obtained from a data table stored in memory beforehand.

Slip frequency $W_s$ is then applied to adder $d_3$ along with motor rpm $W_m$ and the sum is input to a 2-3 phase converter B.

(7) $I_2\omega$ and $\omega_s$ are applied to a multiplier $c_2$, and the product is multiplied by $(L_2/R_2)$. The $\phi$-direction component of the secondary current is obtained in the form $$I_{2M} = (L_2/R_2) \times I_2\omega \times \omega_s$$

This is applied to the adder $d_2$.

(8) The $\phi$-direction component of $I_1$ is obtained in the form $$I_1(\phi) = I_{oM} + I_{2M}$$

by the adder $d_2$.

(9) The $E_1$-direction component of $I_1$ is obtained in the form $$I_1(E_1) = I_o\omega + I_2\omega$$

by an adder $d_1$.

(10) Two orthogonal phases of the primary current command $I_1$ are obtained from a current calculating circuit A and applied to a 2-3 phase converter circuit B.

(11) Command currents $I_u$, $I_v$, $I_w$ in the respective phases of the induction motor M obtained from the 2-3 phase converter circuit B are applied to a current controller C. The actual currents of the respective phases of the induction motor are sensed by CTu, CTv, CTw and compared with the command currents, upon which predetermined control is performed by the current controller C.

In accordance with the system for controlling the torque of an induction motor of the present invention, control is performed in such a manner that a linear output torque is obtained with respect to a torque command. This enables the output torque of the induction motor to be accurately judged at low cost.

Although certain preferred embodiments have been shown and described, it should be understood that many changes and modifications may be made therein without departing from the scope of the appended claims.

What is claimed is:

1. An induction motor torque control system for linearly controlling the output torque of an induction motor in response to a torque command, comprising:
   (a) means for deciding a torque command (Tm) for the induction motor, and an excitation flux ($\Phi$) from an excitation frequency (Wo);
   (b) means for deciding an excitation flux component (Iom) of excitation current (Io) from the excitation flux ($\Phi$);
   (c) means for deciding a component (Iow), in the direction of an electromotive force (E1), of the excitation current (Io) from the excitation flux ($\Phi$) and excitation frequency (Wo);
   (d) means for deciding a component (I2w), in the direction of the electromotive force (E1), of a secondry current (I2) of the induction motor from said torque command (Tm) and excitation flux ($\Phi$);
   (e) means for deciding a slip frequency (Ws) from the component (I2w), in the direction of the electromotive force (E1), of said secondary current (I2) and the excitation flux ($\Phi$);
   (f) means for deciding an excitation flux component (I2m) of the secondary current (I2) from the component (I2w), in the direction of the electromotive force (E1), of the secondary current (I2) and from the slip frequency (Ws); and
   (g) means for obtaining an excitation flux component (I1($\Phi$)) of the primary current (I1) of the induction motor from the sum of the excitation flux components (Iom) and (I2m) of said excitation current (Io) and the secondary current (I2), and a component (I1 (E1)) in the direction of the electromotive force (E1) of the primary current (I1) of the induction motor from the sum of the components (Iow) and I2w) in the direction of the electromotive force (E1) of said excitation current (Io) and secondary current (I2), and for limiting a primary current command for the induction motor upon combining these components.

2. An induction motor torque control system according to claim 1, wherein said slip frequency (Ws) deciding means decides the slip frequency (Ws) from a data table in which the data address is a value obtained by dividing the component (I2w), in the direction of the electromotive force (E1), of the secondary current (I2) by the excitation flux ($\Phi$).

* * * * *

UNITED STATES PATENT AND TRADEMARK OFFICE
CERTIFICATE OF CORRECTION

PATENT NO. : 4,757,248

DATED : July 12, 1988

INVENTOR(S) : FUJIOKA et al.

It is certified that error appears in the above-identified patent and that said Letters Patent is hereby corrected as shown below:

Col. 1
Line 59, delete "a" and insert --from--;
Line 60, delete "from" and insert --a--.

Col. 6
Line 22, delete "condry" and insert --condary--.

Signed and Sealed this

Eighth Day of November, 1988

Attest:

DONALD J. QUIGG

Attesting Officer

Commissioner of Patents and Trademarks